United States Patent [19]
Stouffer

[11] Patent Number: 5,099,753
[45] Date of Patent: Mar. 31, 1992

[54] METHOD AND APPARATUS FOR MAXIMIZING TRANSFER THERMAL ENERGY CONTAINED IN AN OSCILATING OR SWEEPING AIR JET TO A PLATE SURFACE

[75] Inventor: Ronald D. Stouffer, Silver Spring, Md.

[73] Assignee: Bowles Fluidics Corporation, Columbia, Md.

[21] Appl. No.: 578,492

[22] Filed: Sep. 6, 1990

[51] Int. Cl.$^5$ .............................................. B60S 1/54
[52] U.S. Cl. ....................................... 454/125; 454/154
[58] Field of Search ........................ 98/2, 2.08, 2.09

[56] References Cited

U.S. PATENT DOCUMENTS

| | | | |
|---|---|---|---|
| 3,745,906 | 7/1973 | Kakei et al. | 98/2.09 |
| 3,832,939 | 9/1974 | Kakei et al. | 98/2.09 |
| 4,151,955 | 5/1979 | Stouffer | 239/11 |
| 4,250,799 | 2/1981 | Stouffer | 98/2.08 |
| 4,336,909 | 6/1982 | Stouffer | 98/2.08 X |
| 4,365,540 | 12/1982 | Honrado | 98/2 |
| 4,428,277 | 1/1984 | Stouffer | 98/2 |
| 4,437,392 | 3/1984 | Stouffer | 98/2.08 |
| 4,517,881 | 5/1985 | Stouffer | 98/2.08 |
| 4,644,854 | 2/1987 | Stouffer et al. | 98/2.09 |
| 4,672,886 | 6/1987 | Stouffer | 98/2.09 |
| 4,686,890 | 8/1987 | Stouffer et al. | 98/2 |
| 4,694,992 | 9/1987 | Stouffer | 98/2.09 X |
| 4,709,622 | 12/1987 | Stouffer et al. | 98/2 |
| 4,823,682 | 4/1989 | Stouffer | 98/2.09 |
| 4,941,398 | 7/1990 | Morris et al. | 98/2 |

Primary Examiner—Harold Joyce
Attorney, Agent, or Firm—Jim Zegeer

[57] ABSTRACT

A method and apparatus of maximizing transfer of thermal energy to or from an oscillating or swept air jet propogated over a windshield. The air jet is projected through short distances in ambient from a nozzle properly aimed at said windshield. The wavelength of the oscillating or swept jet is caused to be greater than the nozzle distance from windshield and smaller than the length extent of windshield in the direction of air jet propogation across it whereby there is less of loss or gain of thermal energy from said air jet in the space between said nozzle and said windshield and a maximum transfer of thermal energy between the windshield and air jet by lessening the thickness of any insulating boundary layer.

9 Claims, 2 Drawing Sheets

METHOD AND APPARATUS FOR MAXIMIZING TRANSFER THERMAL ENERGY CONTAINED IN AN OSCILATING OR SWEEPING AIR JET TO A PLATE SURFACE

BACKGROUND OF THE INVENTION:

The use of a sweeping jet fluidic oscillators for defrosting/defogging operation for automobile windshields is disclosed in the following patents issued to the assignee hereof: 4,250,799, 4,336,909, 4,365,540, 4,428,277, 4,437,392, 4,517,881, 4,644,854, 4,672,886, 4,686,890, 4,694,992, 4,709,622, 4,823,682, 4,941,398.

All the above patents are assigned to the assignee of the present application.

In Kakei et al. U.S. Pat. Nos. 3,745,906 and 3,832,939, several forms of sweeping jet oscillators for defrost purposes are disclosed, one of which included a fluidic oscillator in which a pair of cross feedback pipes receive portions of air issuing from the outlet downstream of the throat and return same to a pair of control ports. In some of the Stouffer patents mentioned above, a vibrating reed oscillator is utilized which significantly reduce the amount of space under the dash. In some other prior art sweeping jet systems, including Kakei et al., electromagnets were used to control valves for the switching purposes and these require unnecessary complexities and require a fluidic logic element of at least 5W length in order to get adequate sweeping angles where W is the width of the power nozzle. Fluidic oscillators based on a continuous passage or loop interconnecting the pair of control ports of the fluidic element are known in the art and disclose further, for example, in Stouffer et al. Patent 4,644,854 mentioned above.

The present invention is an improvement in that it maximizes the thermal energy transfer to or from a windshield for defrost/defog purposes and, at the same time, reduce the manufacturing cost and complexities of the oscillating fluidic element and improves the form factor and eliminates extraneous elements and connections. According to the present invention, thermal energy transference to or removed from a glass plate is maximized by projecting an oscillating air jet through a predetermined distance from a nozzle aimed at the plate so that an oscillating jet impinges on a plate at a predetermined angle of impingement and the jet is caused to oscillate at a rate such that the wavelength of the projected air is greater than the predetermined distance from the nozzle to the plate and smaller than the length of the plate in the direction of the air jet propogation across it so that there is less loss or gain of thermal energy from the air jet in the short space between the nozzle and the plate and a maximum transfer of thermal energy to the plate within the predetermined length which is accomplished to lessening the thickness of any insulating boundary layer as the air is moved or propogated over the plate.

In a preferred embodiment, a fluidic oscillator in which the wavelength is a constant independent of changing pressure such as the type disclosed in my patent 4,151,955 (incorporated herein by reference) is utilized.

BRIEF DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
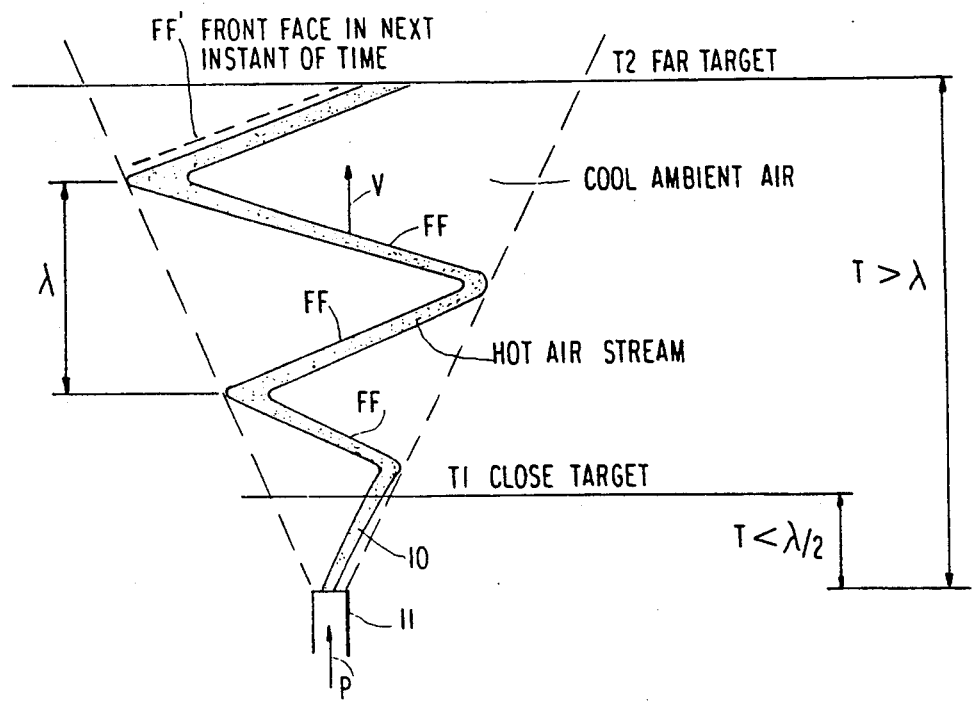
FIG. 1 is an illustrative diagrammatic view illustrating principles of the invention.

In order to explain the principles of the invention, reference is made to FIG. 1 in which an oscillating air jet 10 is issued from an oscillating nozzle 11 and has a characteristic wavelength $\lambda$ at any given supply pressure P. FIG. 1 illustrates different positionings of a target T1, for a close target, and T2, for a far target, with the wavelengths being indicated (and as indicated below, the target T is, in a preferred embodiment, a vehicular windshield and the nozzle 11 is a defrost-/defog nozzle and the air jet 10 is a defrost/defog air jet). In the case of ambient mixing, the hot air stream or jet 10 from oscillating nozzle 11 impinges on a close target T1 (A "close" target is one whose distance from the nozzle is less than $\lambda/2$ and the hot air stream or jet 10 has little chance to mix with the cooler ambient air. For "far" targets such as T2 which are spaced a substantially greater distance than the wavelength $\lambda$ (T > $\lambda$), the hot air stream or jet 10 can readily mix with the ambient. Since the jet 10 is being oscillated, each segment of the air proceeds radially from the nozzle at a velocity V, and the air stream or jet 10 makes an oblique angle to the radial lines, thus forming the front faces FF. In FIG. 1, the front face in the next instant of time is indicated at FF by dashed lines. This front-face array of the hot air stream readily promotes mixing with the ambient air. Thus, according to the invention, mixing with ambient air is minimized by oscillating at a frequency which is consistent with half the wavelength and being greater than the target distance from the nozzle:

$$\frac{\lambda}{2} \geq T \text{ and } \lambda = \frac{V}{F}$$

where:
T = distance from target to nozzle
$\lambda$ = wavelength of oscillating hot air stream
V = exit velocity of air stream
F = frequency of oscillation of air stream For example, if the exit velocity V is 60 ft/sec. and the target (windshield) is 5 ft from the nozzle:

$$\frac{\lambda}{2} \geq T \text{ or } \lambda \geq 2T$$
$$\lambda \geq 2 \times .5 = 1 \text{ ft}$$
$$F = \frac{V}{\lambda} = \frac{60}{1} = 60 \text{ Hz}$$

Thus, in this example, the frequency or rate of oscillation should be about 60 Hz or less for minimal mixing for typical windshield of vehicles. These frequencies and ranges can, of course, change or be optimized for each vehicle design.

Figure 2:
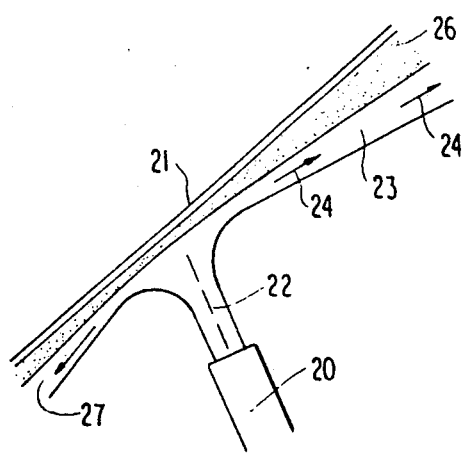
FIG. 2 is a side sectional view of a jet from a nozzle impinging on a glass plate and illustrating the boundary layer formed by a hot air stream following thereover from the nozzle.

As is well known, a boundary layer of gas molecules adjacent the plate forms a boundary layer insulator. As shown in FIG. 2, in a steady state case, e.g., no oscillations, air is projected from a nozzle 20 to impinge on a glass plate or target 21 and the major portion 23 is directed in the direction of the arrows 24 along the inner surface of the glass plate 21 and a boundary layer generally indicated by the numeral 25 is formed. As is well known, the boundary layer consists of molecules of gas attached to and slowly moving along the inner surface of glass plate 21 and in the steady state case, heat transfer between the hot air stream 22, 23 and the glass is impeded by the low velocity boundary layer 26. Where the jet impinges on the plate, a somewhat similar case occurs with respect to the downwardly moving small portion 27.

Figure 3:
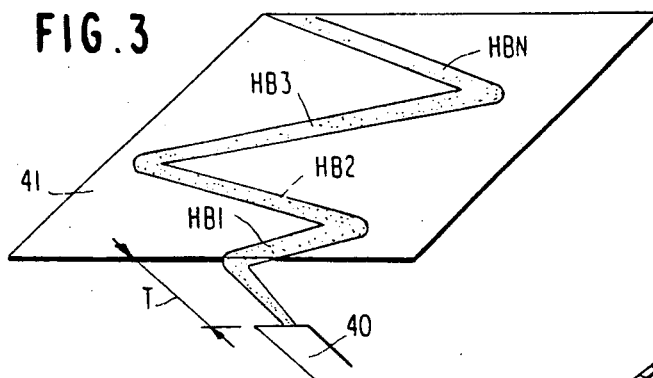
FIG. 3 illustrates the general principle of a method aspect according to the invention in which the jet is oscillated at a rate such that the wavelength of the jet issued to ambient is greater than the distance from the nozzle to the glass plate and smaller than the length of the plate in the direction of the jet of propogation across it.
Figure 4:
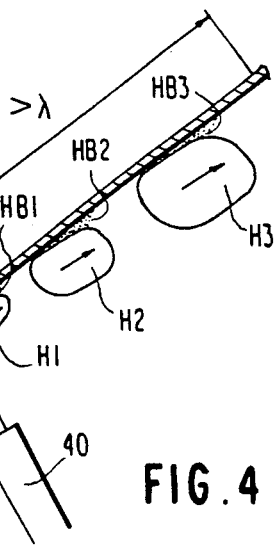
FIG. 4 is a sectional view of the embodiment shown in FIG. 3.

Referring to FIGS. 3 and 4, the oscillating nozzle 40 is spaced a distance D from glass plate 41 so that the issuing jet is propogated into an ambient space and the jet is caused to have a wavelength which is greater than the distance T from the nozzle 40 to the glass plate 41 and at a predetermined impingement angle $\alpha$ which can be between about 33 degrees and about 85.

Moreover, in accordance with the invention, this frequency is also at a sufficient rate that the boundary layer is broken up, or more accurately stated, is prevented from forming. As indicated in FIG. 4, the distance T is $\lambda/2$ and the length of the glass over which the heat is to be distributed is greater than $\lambda$. By virtue of this last criteria, the cross-section of a hot air stream (H1, H2, H3 ... HN) is such that a very thin boundary layer HB1, HB2, HB3 is formed. Because of the upset of the boundary layer forming mechanism, more heat or thermal energy is delivered (or removed) to the window or glass plate 41. Of course, the higher the frequency, the less thick is the boundary layer. Whereas, the lower the frequency (the longer the wavelength) the less mixing there is.

According to the invention, it has been discovered that it is practical in the case of automobile defroster, for example, that one can select an appropriate frequency (or wavelength) that meets both the mixing and boundary layer criteria discussed above. Thus, according to the invention, the wavelength is greater than the nozzle distance from the target and also this selected wavelength is smaller than the extent of the windshield in the direction of the stream propogation across it. This selection of wavelength both lessens the loss (or gain, in the case of defog) of heat on the way to (or removed from, in the case of defog) the glass and maximizes heat transfer to the glass by the lessening of the thickness of the insulating boundary layer HB1, HB2, HB3 ... HBN.

Figure 5:
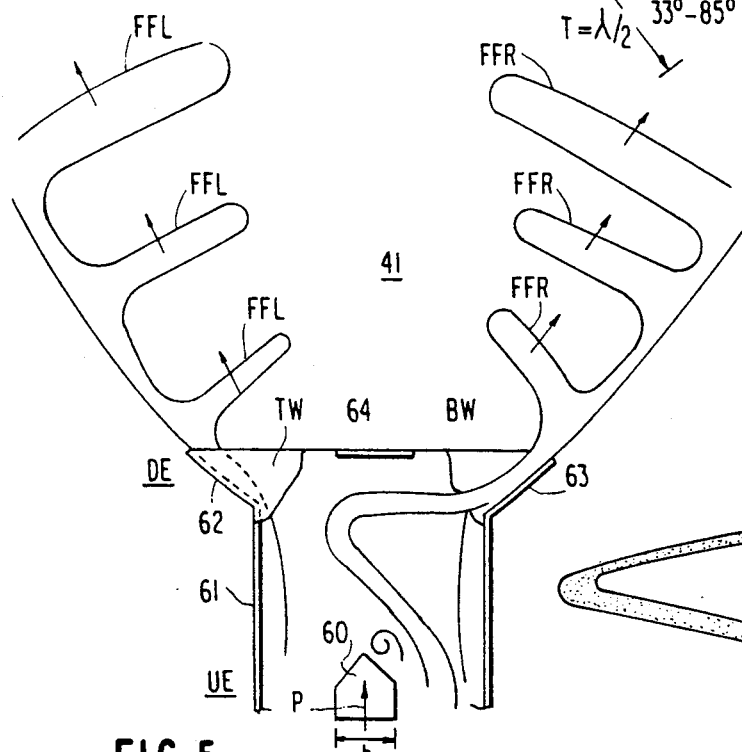
FIG. 5 is a top plan view of an wide angled dual pattern nozzle incorporating an island oscillator of the type disclosed in my patent 4,151,955 in a defroster nozzle.
Figure 6:
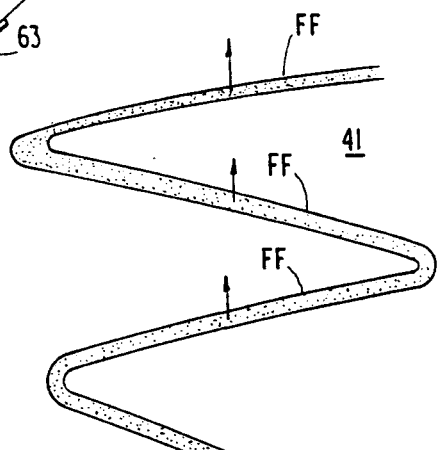
FIG. 6 is a narrow angle single pattern nozzle incorporating the invention.
Figure 6:
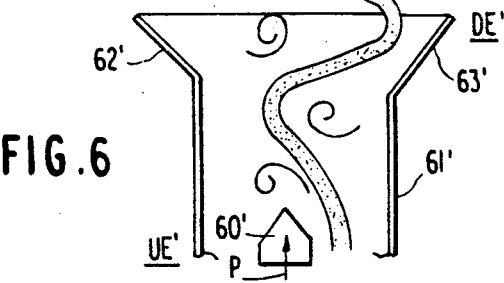

Referring now to FIGS. 5 and 6, the conditions discussed above are met preferably by an island oscillator of the type disclosed in my patent 4,151,955. Such oscillators can be fabricated at much lower cost and are less complex than prior art swept jet defrost/defog systems. Referring specifically to FIG. 5, the oscillating fluidic nozzle includes an island member 60 which is positioned in duct 61 which has an upstream end UE containing the island oscillator 60 and a downstream end DE having a pair of diverging sidewalls 62, 63 and a barrier or divider 64 which provides a wide angle, dual pattern of defrost air for issuing upon a windshield and may be centrally located on the dashboard of a vehicle so as to impinge upon the driver and passenger sides thereof. Top and bottom walls TW and BW may be planar and parallel or they may diverge. As illustrated, island 60 sheds vortices alternately on each side thereof and in the time frame indicated in FIG. 5, the vortices cyclically oscillate the defrost/defog air jet. The vortices cause the defrost/defog air stream to be cyclically swept transversely of the longitudinal axis and to each side of barrier or divider 64 to produce wide angle—dual pattern. Diverging walls 62, 63 establish physical boundaries or limits for the sweeping jet. The sweeping jet establishes front faces $FF_1$, $FF_2$, $FFL_3$, $FFL_3$ for the left side and $FL_{R1}$, $FF_{R2}$, $FF_{R3}$ for the right side which moves in the directions indicated by the arrows over the driver and passenger sides of windshield 41. Thus, because of this higher frequency (e.g., shorter wavelength) of operation, the boundary layer is broken up, resulting in a much thinner insulating boundary layer so that more thermal energy is transferred to the glass for defrost operation (or removed from the glass for defog operation).

In the embodiment shown in FIG. 6, a narrower angle, single pattern is produced and the windshield 41 with the wave fronts FF moving or being propogated over the windshield surface in the direction indicated by the arrows. As shown in the sectional view of FIG. 4, the jet segments $H_1$, $H_2$, $H_3$ expand in the direction of ambient and are confined by the inner windshield surface as they are propogated by the momentum of their initial velocities.

CHARACTERISTIC WAVELENGTH

The wavelength of a specific fluidic oscillator such as the island-type of fluidic element, shown in FIGS. 5 and 6, is constant, once the design variables are frozen. So that the relationship of the wavelength to the application viz. target to nozzle distance, travel over the window, is held constant over the entire pressure range. It's superior performance is preserved over all operating pressures. This is shown in the following:

The oscillator's frequency F is:

$$F = K_F Q$$

where Q=flow rate
and Q=AV
A=equivalent orifice area
V=velocity
The wavelength $\lambda$ is:

$$\lambda = \frac{V}{F} = \frac{V}{K_F Q} = \frac{V}{K_F A V} = \frac{1}{K_F A}$$

and therefore is, advantageously, a constant independent of changing pressure.

The wavelength (λ) of an island oscillator of the type disclosed in my patent 4,151,955 is:

$$\lambda = \frac{V}{F}$$

This ratio of V/F is also found in a dimensionless parameter known as Strouhal number(s).

$$S = \frac{fh}{V}$$

where h is characteristic length (base of triangular-=island)

Figure 7:
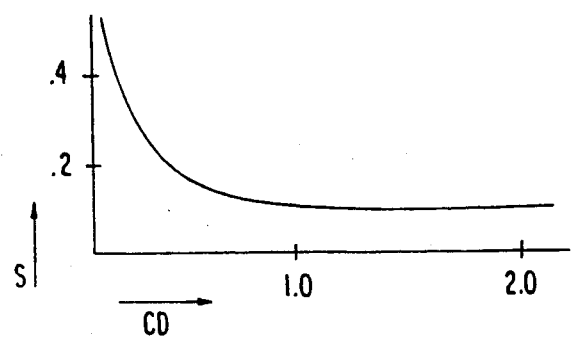
FIG. 7 is a plot of Straukal numbers vs. drag coefficient.

It has been found that the Strouhal number or frequency characteristic is related to the drag coefficient CD of a shape (shown in FIG. 7). The CD of the triangular shape we are using is 2.0 so that the Strouhal number is 0.13. Therefore, the wavelength λ is:

$$\lambda = \frac{V}{F} = \frac{h}{s} = \frac{h}{1.3}$$

which, advantageously wholly determined by selecting h. While there has been disclosed and described preferred embodiments of the invention, it is to be noted that various changes and modifications will be apparent to those skilled in the art and it is intended that such changes and modifications be encompassed and included within the scope and spirit of the claims appended hereto.

What is claimed is:

1. Vehicular defrost apparatus for maximizing transfer of thermal energy contained in a defrost air jet to a glass windshield having a predetermined length and an interior surface, said defrost air jet being propagated over the interior surface of said glass windshield, comprising:
   a fluidic oscillating nozzle, having a characteristic wavelength λ at a given frequency, for issuing said defrost air jet to ambient at a given defrost air velocity V, means positioning said oscillating nozzle a predetermined distance from said glass windshield and at a predetermined angle for impingement and propagation of defrost air across said surface of said glass windshield, and
   means in said oscillating nozzle means for causing the wavelength λ of the jet issued to ambient to be greater than the predetermined distance from said nozzle to said glass windshield and significantly smaller than said length of said glass windshield in the direction of air jet propagation across it whereby there is less of loss of thermal energy from said air jet in the space defined by said predetermined distance between said nozzle and said plate and a plurality of front faces moving across said surface are created to cause maximum transfer of thermal energy to said glass windshield by lessening the thickness of any insulating boundary layer.

2. The vehicular defrost apparatus defined in claim 1 wherein said fluidic oscillator is an island oscillator means for generating alternating vortices to each side thereof.

3. The vehicular defrost apparatus defined in claim 2 in which said oscillating nozzle has an upstream end and a downstream end, said island oscillator means being located at said upstream end, and including a barrier means at the downstream end of said nozzle means.

4. A method of maximizing transfer of thermal energy contained in an air jet to a plate having a predetermined length, comprising:
   providing a fluidic nozzle oriented to impinge said air jet on said plate at a predetermined angle,
   projecting said air jet from a fluidic nozzle toward said plate, oscillating air at a frequency F to cause the wavelength λ of the projected air jet to be significantly smaller than said predetermined length of said plate in the direction of air jet propagation across it whereby a maximum transfer of thermal energy to said plate within said predetermined length is caused by lessening the thickness of any insulating boundary layer as said air is moved in a plurality of front faces over said plate.

5. Vehicular defrost/defog apparatus for maximizing transfer of thermal energy between a defrost/defog air jet and a glass plate in said vehicle having an interior surface with a predetermined length, said defrost/defog air jet being propagated over the surface of said glass plate, comprising:
   oscillating nozzle means sweeping said defrost/defog air jet at a rate to cause a plurality of front faces of defrost/defog air, means positioning said nozzle means a predetermined distance from said glass plate and at a predetermined angle for impingement and propagation of said front faces of defrost/defog air across said glass surface, and
   means for causing the wavelength of the jet issued to ambient to be greater than the predetermined distance from said nozzle to said glass plate and significantly smaller than said length of said plate in the direction of air jet propagation across it so as to cause a plurality of front faces to move across said glass plate.

6. The vehicular defrost/defog apparatus defined in claim 5 wherein said means for causing the wavelength of the jet issued to ambient is a fluidic oscillator.

7. The vehicular defrost apparatus defined in claim 6 wherein said fluidic oscillator includes means for generating alternating vortices to each side thereof.

8. The vehicular defrost apparatus defined in claim 7 in which said nozzle includes a duct having an upstream end and a downstream end, said island being located at said upstream end and a barrier means at the downstream end of said nozzle means.

9. A method of maximizing exchange of thermal energy between an air jet and a glass plate having a contact surface with a predetermined length, comprising:
   projecting said air jet from a nozzle aimed at said plate so that said oscillating jet impinges on said glass plate at a predetermined angle of impingement, and
   causing the wavelength of the oscillating air jet to be much smaller than said predetermined length of said glass plate in the direction of air jet propagation across it so that a plurality of front faces are propagated across the contact surface from where said air jet impinges on said glass plate.

* * * * *